United States Patent
Liao

(10) Patent No.: US 12,367,554 B2
(45) Date of Patent: Jul. 22, 2025

(54) EFFECT IMAGE PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Yunhao Liao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/761,095

(22) Filed: Jul. 1, 2024

(65) Prior Publication Data
US 2024/0354904 A1    Oct. 24, 2024

Related U.S. Application Data

(63) Continuation of application No. PCT/CN2022/140246, filed on Dec. 20, 2022.

(30) Foreign Application Priority Data

Dec. 30, 2021    (CN) .......................... 202111653932.2

(51) Int. Cl.
*G06T 5/50* (2006.01)
*G06F 3/0483* (2013.01)
(Continued)

(52) U.S. Cl.
CPC .............. *G06T 5/50* (2013.01); *G06F 3/0483* (2013.01); *G06T 5/70* (2024.01); *G06V 10/60* (2022.01);
(Continued)

(58) Field of Classification Search
CPC ... G06T 5/50; G06T 5/70; G06T 2207/20221; G06T 2207/30201; G06F 3/0483;
(Continued)

(56) References Cited

U.S. PATENT DOCUMENTS

| 2004/0164975 A1* | 8/2004 | Ho ........................ G06F 3/0483 345/204 |
|---|---|---|
| 2010/0231786 A1 | 9/2010 | Tsubota et al. |

(Continued)

FOREIGN PATENT DOCUMENTS

| CN | 1854992 A | * 11/2006 |
|---|---|---|
| CN | 102073652 A | 5/2011 |

(Continued)

OTHER PUBLICATIONS

Lichan Hong, Stuart K. Card, and Jindong (JD) Chen, Turning Pages of 3D Electronic Books, 2006, IEEE, IEEE Symposium on 3D User Interfaces 2006, 3D User Interfaces (3DUI'06), pp. 159-165. (Year: 2006).*

(Continued)

*Primary Examiner* — Jeffery A Brier
(74) *Attorney, Agent, or Firm* — Astute IP Law Group

(57) ABSTRACT

Embodiments of the disclosure provide an effect image processing method and apparatus, an electronic device, and a storage medium. The method includes: in response to an effect trigger operation, determining at least one to-be-presented effect image, and presenting the at least one to-be-presented effect image according to a preset image present mode; in response to detecting that a page turning condition is satisfied in a present process, performing a target page turning effect on a current displayed to-be-presented effect image, and presenting the remaining to-be-presented effect image from the at least one to-be-presented effect image according to the image present mode until an effect present stop operation is received.

19 Claims, 4 Drawing Sheets

---

Determine, in response to an effect trigger operation, at least one to-be-presented effect image, and present the at least one to-be-presented effect image according to a preset image present mode ⟶ S110

If it is detected that a page turning condition is satisfied in a present process, perform a target page turning effect on the current displayed to-be-presented effect image, and present the remaining to-be-presented effect image according to the image present mode until an effect present stop operation is received ⟶ S120

(51) Int. Cl.
*G06T 5/70* (2024.01)
*G06V 10/60* (2022.01)

(52) U.S. Cl.
CPC ............... *G06T 2207/20221* (2013.01); *G06T 2207/30201* (2013.01)

(58) Field of Classification Search
CPC .... G06F 3/0481; G06F 3/04842; G06F 9/451; G06F 3/04845; G06V 10/60; G11B 27/038; G11B 27/105
See application file for complete search history.

(56) References Cited

U.S. PATENT DOCUMENTS

| 2012/0311438 A1* | 12/2012 | Cranfill | G06F 3/0483 715/256 |
|---|---|---|---|
| 2019/0102053 A1 | 4/2019 | Ishida | |

FOREIGN PATENT DOCUMENTS

| CN | 102184104 | A | | 9/2011 |
|---|---|---|---|---|
| CN | 103970432 | A | | 8/2014 |
| CN | 105404489 | A | | 3/2016 |
| CN | 109675312 | A | | 4/2019 |
| CN | 112269891 | A | | 1/2021 |
| CN | 112312161 | A | | 2/2021 |
| CN | 112764845 | A | | 5/2021 |
| CN | 114428573 | A | | 5/2022 |
| JP | H07295995 | A | * | 11/1995 |
| JP | 2507344 | B2 | * | 6/1996 |
| JP | H10154158 | A | * | 6/1998 |
| JP | 2005072964 | A | | 3/2005 |
| JP | 2011-077668 | A | | 4/2011 |
| WO | WO-2014061775 | A1 | * | 4/2014 |

OTHER PUBLICATIONS

"Teach you how to make a digital photo album of your whole family's New Year photos in one minute", Qimingdeng, Available on the Internet at: http://www.qimingdeng.com/edu/show-I 5.html), Jan. 12, 2019, 12 pages (6 pages of English Translation and 6 pages of Original Document).

International Search Report and Written Opinion received for PCT Patent Application No. PCT/CN2022/140246, mailed on Mar. 1, 2023, 13 pages (6 pages of English Translation and 7 pages of Original Document).

Office Action received for Chinese Patent Application No. 202111653932.2, mailed on Jun. 13, 2023, 14 pages (5 pages of English Translation and 9 pages of Original Document).

Office Action received for Chinese Patent Application No. 202111653932.2, mailed on Oct. 14, 2023, 13 pages (5 pages of English Translation and 8 pages of Original Document).

Extended European Search Report for European Patent Application No. 22914386.2, mailed on Feb. 21, 2025, 8 pages.

* cited by examiner

EFFECT IMAGE PROCESSING METHOD AND APPARATUS, ELECTRONIC DEVICE, AND STORAGE MEDIUM

CROSS-REFERENCE TO RELATED APPLICATION(S)

This application is a Continuation Application of International Application Serial No. PCT/CN2022/140246, filed on Dec. 20, 2022, which claims priority to Chinese Patent Application No. "202111653932.2", filed with China National Intellectual Property Administration on Dec. 30, 2021, the disclosures of which are incorporated herein by reference in their entireties.

FIELD

Embodiments of the disclosure relate to the technical field of image processing, and for example, relate to an effect image processing method and apparatus, an electronic device, and a storage medium.

BACKGROUND

With the development of network technology, more and more applications have been applied to lives of users, especially a series of software that can shoot short videos, which are deeply loved by the users.

In order to enhance the interest of video shooting, software developers can develop a variety of effect props. However, the number of effect props developed at present is very limited, and the richness of video content needs to be further improved. Especially when a plurality of views are presented, the effects displayed by existing effects have certain limitations.

SUMMARY

Embodiments of the disclosure provide an effect image processing method and apparatus, an electronic device, and a storage medium.

In a first aspect, an embodiment of the disclosure provides an effect image processing method. The method includes: in response to an effect trigger operation, determining at least one to-be-presented effect image, and presenting the at least one to-be-presented effect image according to a preset image present mode; and in response to detecting that a page turning condition is satisfied in a present process, performing a target page turning effect on a current displayed to-be-presented effect image, and presenting the remaining to-be-presented effect image from the at least one to-be-presented effect image according to the image present mode until an effect present stop operation is received.

In a second aspect, an embodiment of the disclosure further provides a effect image processing apparatus. The apparatus includes: a to-be-presented effect image determination module and a target page turning effect present module.

The to-be-presented effect image determination module is configured to, in response to an effect trigger operation, determine at least one to-be-presented effect image, and present the at least one to-be-presented effect image according to a preset image present mode.

The target page turning effect present module is configured to, in response to detecting that a page turning condition is satisfied in a present process, perform a target page turning effect on a current displayed to-be-presented effect image, and present the remaining to-be-presented effect image from the at least one to-be-presented effect image according to the image present mode until an effect present stop operation is received.

In a third aspect, an embodiment of the disclosure further provides an electronic device. The electronic device includes: one or more processors; and a storage means, configured to store one or more programs. When the one or more programs are executed by the one or more processors, the one or more processors are caused to implement the effect image processing method according to any one of the embodiments of the disclosure.

In a fourth aspect, an embodiment of the disclosure further provides a storage medium including computer executable instructions. The computer executable instructions, when executed by a computer processor, are configured to execute the effect image processing method according to any one of the embodiments of the disclosure.

BRIEF DESCRIPTION OF THE DRAWINGS

The above and other features, advantages, and aspects of various embodiments of the disclosure will become more apparent in conjunction with the accompanying drawings and with reference to following specific implementations. In the accompanying drawings, same or similar reference numerals denote same or similar elements. It should be understood that the accompanying drawings are illustrative, and components and elements may not necessarily be drawn to scale.

DETAILED DESCRIPTION OF EMBODIMENTS

Figure 1:
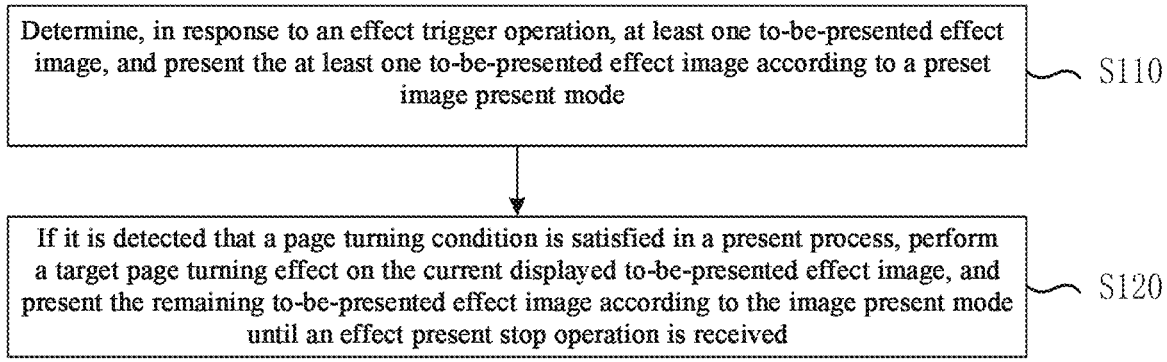
FIG. 1 is a schematic flowchart of an effect image processing method according to Embodiment 1 of the disclosure.

Embodiments of the disclosure will be described with reference to the accompanying drawings below. Although the accompanying drawings show some embodiments of the disclosure, it should be understood that the disclosure may be implemented in various forms, and should not be construed as being limited to the embodiments stated herein. On the contrary, these embodiments are provided for a more thorough and complete understanding of the disclosure. It should be understood that the accompanying drawings and the embodiments of the disclosure are for exemplary purposes only, and are not intended to limit the scope of protection of the disclosure.

It should be understood that the steps recorded in the method implementations in the disclosure may be performed in different orders and/or in parallel. In addition, the method implementations may include additional steps and/or omit the execution of the shown steps. The scope of the disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that "first," "second," and other concepts mentioned in the disclosure are only for distinguishing different apparatuses, modules, or units, and are not intended to limit the order or relation of interdependence of functions performed by these apparatuses, modules, or units.

It should be noted that modifications such as "a" and "a plurality of" mentioned in the disclosure are indicative rather than limiting, and those skilled in the art should understand that unless otherwise explicitly specified in the context, it should be interpreted as "one or more".

Before introducing this embodiment, application scenarios may be first exemplarily described. This embodiment of the disclosure may be applied to any frame needing effect displays, and for example, may be applied in a case of performing the effect present on an image corresponding to a captured user in the video shooting process, such as in a short video shooting scenario.

In this embodiment, when the user uses corresponding application software and expects a plurality of frames to be presented with the visual effect of calendar page turning during the plurality of frames being switched, an effect trigger operation may be performed, such that the visual effect of "calendar page turning" is displayed in the process of switching effect images, and the final displayed page turning effect is not limited to the above calendar page turning form, and may also be a page turning form such as book folding.

In other words, this embodiment of the disclosure provides a user with an example of presenting a plurality of effect images with a page turning effect, which may simulate a plurality of page turning visual effects of a real object.

Embodiment 1

FIG. 1 is a schematic flowchart of an effect image processing method according to Embodiment 1 of the disclosure. In this embodiment, a plurality of images may be processed into effect images and presented in any image present scenario supported by the Internet. The method may be executed by an effect image processing apparatus. The apparatus may be implemented in the form of software and/or hardware. The hardware may be an electronic device, such as a mobile terminal, a personal computer (PC) terminal, or a server. Any image present scenario is typically implemented through cooperation of a client and the server. The method provided by this embodiment may be executed by a server side, or the client, or through cooperation of the client and the server side.

As shown in FIG. 1, the method in this embodiment includes the following:

S110: in response to an effect trigger operation, at least one to-be-presented effect image is determined, and the at least one to-be-presented effect image is presented according to a preset image present mode.

An apparatus for executing the effect image processing method provided by this embodiment of the disclosure may be integrated into application software supporting an effect image processing function. The software may be installed in an electronic device. For example, the electronic device may be a mobile terminal, or a PC terminal, etc. The application software may be a type of software for image/video processing. Specific application software is not enumerated, as long as image/video processing can be achieved. It may also be software with a specifically developed application to achieve the addition and present of effects, or it may be integrated into a corresponding page, and the user can achieve effect addition processing through the integrated page in the PC terminal.

In this embodiment, in the application software or application supporting the effect image processing function, a control for triggering effects may be developed in advance. When it is detected that the user triggers the control, a response may be made to the effect trigger operation, thereby determining the to-be-presented effect image.

The to-be-presented effect image may be an image obtained after effect processing based on user selection, and may also be an image that is stored in a specific database and conforms to an effect present effect selected by the user.

Exemplarily, when the application software or application responds to the effect trigger operation, a corresponding effect identifier may be determined. For example, one or more images preselected by the user are processed based on a program associated with the effect identifier, and a processing result is taken as a to-be-presented effect image; or, in response to the effect trigger operation, a plurality of effect images associated with the effect are determined in a specific database, and one or more of the determined plurality of effect images are determined as to-be-presented effect images based on a preset screening rule.

Those skilled in the art should understand that in the practical application process, the to-be-presented effect image may be obtained in a mode of real-time processing and may also be retrieved from the stored effect images. Meanwhile, the determined current effect image may be a static image or a dynamic image, which is not limited by this embodiment of the disclosure.

In an embodiment, after at least one to-be-presented effect image is determined, the effect image may be presented in a target display interface of application software according to a preset image present mode. There are various image present modes. For example, before detecting that a page turning condition is satisfied, at least one to-be-presented effect image is sequentially presented according to a preset time interval; and one of the to-be-presented effect images is continuously presented, and when it is detected that the page turning condition is satisfied, the next to-be-presented effect image is presented.

For example, in the process of presenting effect images, the effect images may be sequentially presented. An actual present duration of the current presented effect image is determined based on a pre-written monitoring program. When the actual present duration reaches a preset time interval, various images after the current effect image are sequentially presented based on a present sequence formulated by the application for the to-be-presented effect images. It should be understood that in the process of presenting any one of the images, the display interface of the application software is kept in a static state.

Exemplarily, when it is determined that there are 20 to-be-presented effect images, a sequence of generating the images may be taken as a present sequence, and meanwhile a preset image present time interval is 1.5 s. Based on this, after the first image is continuously presented for 1.5 s, the second image may be retrieved to replace the image in the display interface. When the fifth image is presented, if it is detected that the page turning condition is satisfied, the switching process between the fifth image and the sixth image may be displayed with a page turning visual effect. In an example, before the next page turning condition is satisfied, the sixth image and the subsequent images may continue to be sequentially presented on the display interface according to a rule of presenting each image for 1.5 seconds. Another present mode may include: presenting a first to-be-presented effect image, and when it is detected that the page turning condition is satisfied, presenting a second effect image in a page turning mode.

In this embodiment, the effect trigger operation includes at least one of the following: triggering a page-turning effect prop; monitored voice information including an effect addition instruction; and detecting that the display interface includes a facial image.

The page-turning effect prop may be triggered by a button presented on the display interface of the application software, and the triggering of the button characterizes the need to determine the current effect image.

In practical application, if the user triggers the button, it may be considered that an image function of the page turning effect presentation needs to be triggered, that is, a plurality of images need to be dynamically displayed with the effect of page turning.

It should be understood that when the page-turning effect prop further includes a plurality of types (e.g., a calendar type page turning effect or book type page turning effect), the page turning effect displayed by the plurality of images may be consistent with the type selected by the user in the subsequent process. Alternatively, a microphone array deployed on the terminal device collects voice information, and the voice information is analyzed and processed. If a processing result includes words for adding effects, it indicates that the effect addition function is triggered. The advantage of determining whether to add effects based on the content of the voice information is that interaction between the user and a display page is avoided, thereby improving the intelligence of effect addition. According to another implementation, whether a facial image of the user is included within a field-of-view range is determined based on a shooting field-of-view range of the mobile terminal. When the facial image of the user is detected, the application software may take the event of detecting the facial image as a trigger operation for the page-turning effect. Those skilled in the art should understand that which event selected as the effect page turning condition may be set according to actual situations, and this embodiment of the disclosure does not impose limitations in this regard.

S120: if it is detected that the page turning condition is satisfied in the present process, a target page turning effect is performed on the current displayed to-be-presented effect image, and the remaining to-be-presented effect image is presented according to the image present mode until an effect present stop operation is received.

In this embodiment, the page turning condition includes at least one of the following: the continuous present duration of the to-be-presented effect images reaching a first present duration; the number of the continuously presented to-be-presented effect images reaching a preset number threshold; and the continuous present duration of the current to-be-presented effect image reaching the first present duration.

The page turning condition may be determined based on a page turning program. The page turning perform program may be pre-written in the application software and include program code corresponding to the execution of the page turning operation. The first present duration may be preset according to actual needs. For example, the first present duration may be 1.5 S.

Exemplarily, the continuous present duration of the to-be-presented effect images is preset to 1.5 seconds, the present duration of each to-be-presented effect image is 0.5 s, and in this case, within the continuous present duration of 1.5 s, three to-be-presented effect images can be presented. When it is detected that the three to-be-presented effect images are continuously presented, it is determined that the page turning condition is satisfied, and the page turning perform program needs to be run; or, the preset number threshold of the effect images is preset to 5, the number of the sequentially displayed to-be-presented effect images is monitored and accumulated, and when it is determined that the number of the current sequentially presented effect images is 5, it is determined that the page turning condition is satisfied, and the page turning perform program needs to be run; or, when the to-be-presented effect image is presented statically in the display interface, the first present duration is preset to 1.5 seconds, the present time of the current displayed specific image is recorded, and when it is determined that the present duration of the image reaches the first present duration of 1.5 seconds, it is determined that the page turning condition is satisfied, and the page turning perform program needs to be run.

In an embodiment, after it is detected that the page turning condition is satisfied, the target page turning effect may be performed on the displayed to-be-presented effect image, where the target page turning effect may be a dynamic effect displayed in the process of switching two images. For the perspective of the user, the target page turning effect may be an animation effect. From the perspective of a computer, the presentation of the effect involves operation of a series of graphics related programs. For example, when one image is display on the display interface corresponding to the application, if the target page turning effect is performed on the current displayed image, the application may retrieve another effect image to replace the current image. Meanwhile, in the process of switching the two images, the application may control an object carrying the two effect images in a three-dimensional space, making the switching process display a visual effect like calendar page turning or book page turning in reality.

For example, in the process of performing the target page turning effect on the displayed to-be-presented effect images, the page turning effect generated during switching the plurality of to-be-presented effect images may be similar to the calendar page turning effect. For example, when the display interface of the application software displays one effect image from the to-be-presented effect images, if it is detected that the page turning condition is satisfied, an upper half part of the current displayed effect image may be overturned to a lower half part of the current displayed effect image with a horizontal central line of the current displayed effect image as an axis. In an example, in the turning process, the upper half part of the next effect image may gradually appear behind the upper half part of the current effect image, and meanwhile, the lower half part of the next effect image gradually appears on the reverse side of the upper half part of the current effect image, such that a visual effect similar to calendar page turning in reality is displayed during switching the two effect images.

After switching the displayed effect image, upcoming to-be-presented effect images are presented according to an existing image present mode. In this embodiment, the plurality of to-be-presented effect images may be sequentially displayed on the display interface according to the effect image present mode until the effect present stop operation is received. There are various operations to stop the effect display. According to a first manner, the operation of the user in closing the application software or application that supports an effect image processing function is taken as the effect present stop operation. According to a second manner, the operation of the user in triggering a pause control on the display interface as the effect present stop operation. It is unnecessary to develop the aforementioned pause control in the application software in the practical application process; in this case, if the user wants the application software to stop the present of the plurality of effect images, the user may touch any region on the display interface, and when the application software detects the touch operation of the user, execution of processing and display programs for the plurality of effect images may be stopped, and the current displayed effect image is kept displayed on the display interface. According to a third manner, in the process of presenting the plurality of to-be-presented effect images, if facial information of the user is not detected in frames collected by a camera device in real time, the effect presentation is stopped, and in this manner, the application can effectively avoid applying the page turning effect to a plurality of meaningless frames.

It should be noted that a target effect image is obtained based on a processing result of each to-be-processed image, and all target effect images form a target video.

In this embodiment, at least one to-be-presented effect image can be determined in response to the effect trigger operation, and the at least one to-be-presented effect image is presented according to the preset image present mode; and if it is detected that the page turning condition is satisfied in the present process, the target page turning effect is performed on the current displayed to-be-presented effect image, the remaining to-be-presented effect image is presented according to the image present mode until the effect present stop operation is received. Props for the effect present are enriched. When the user uses the effect prop, the plurality of effect images can be processed, and the visual effect of page turning is displayed in the effect image switching process, thereby enhancing the richness and interest of the frame content, and also improving an effect of interaction with the user.

Embodiment 2

Figure 2:
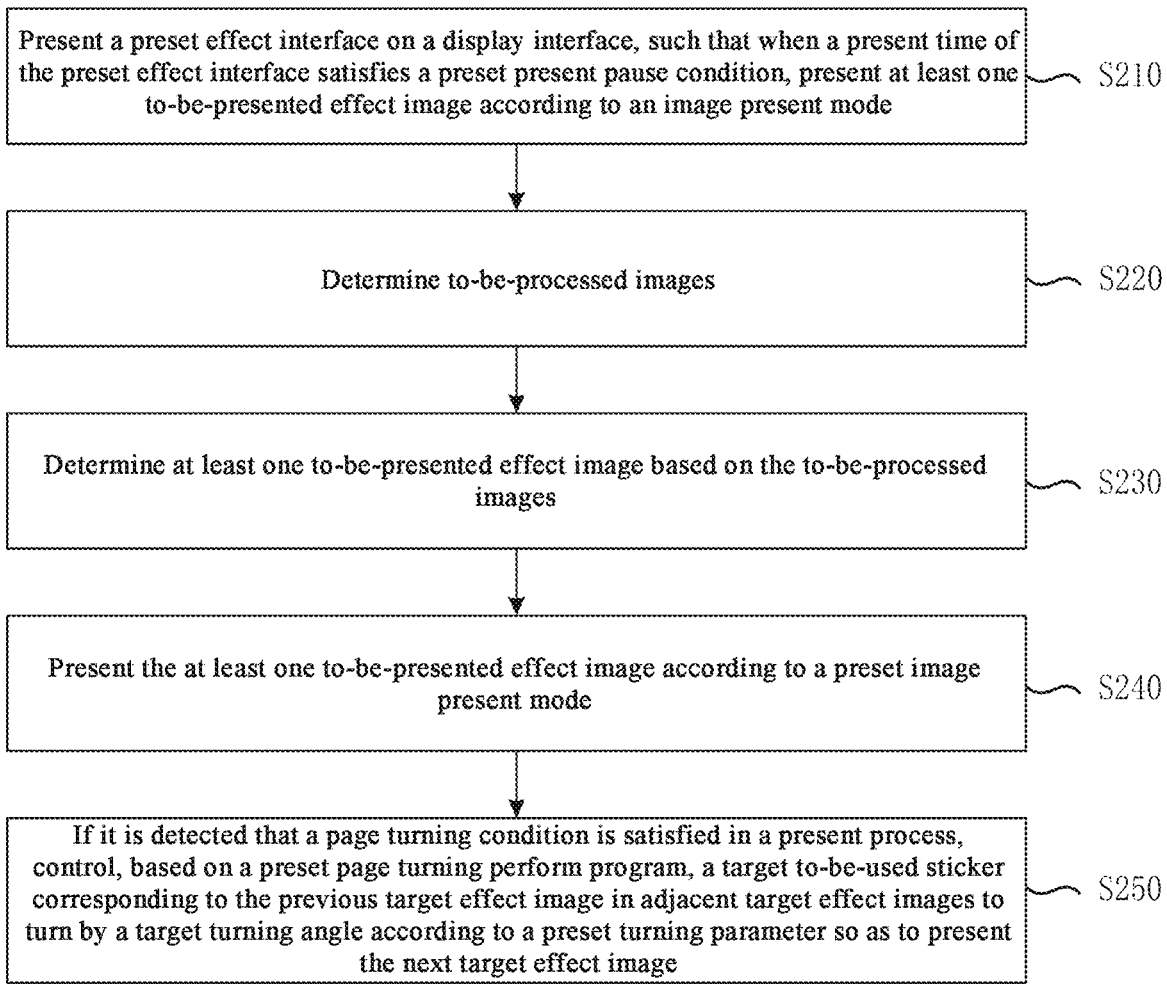
FIG. 2 is a schematic flowchart of an effect image processing method according to Embodiment 2 of the disclosure.

FIG. 2 is a schematic flowchart of an effect image processing method according to Embodiment 2 of the disclosure. Based on the foregoing embodiment, to further enrich the displayed frame content, a preset effect interface may be displayed on a display interface in the process of presenting to-be-presented effect images. For a displayed method, reference may be made to the content of this embodiment. Meanwhile, from the perspective of a computer, how to display a visual effect of calendar page turning to the process of switching two effect images is described. For a specific implementation, reference may be made to this embodiment. Technical terms that are the same with or corresponding to those in the foregoing embodiment are not repeated herein.

As shown in FIG. 2, the method includes the following steps:

S210: a preset effect interface is presented on a display interface, such that when a present time of the preset effect interface satisfies a preset present pause condition, at least one to-be-presented effect image is presented according to an image present mode.

The preset effect interface may be a static effect interface or a dynamic effect interface. The static effect interface may be an interface constructed based on an image including static content. Correspondingly, the dynamic effect interface may be an interface constructed based on an image with at least one dynamic element in content. For example, the preset effect interface includes preset texts and preset images. For example, when the user selects an effect associated with New Year's Day festival in application software, before an effect image to be presented is determined, a pre-stored static image with the text "Happy New Year" may be first displayed on the display interface; or, a pre-stored dynamic image with continuously flashing lights is displayed on the display interface.

In the process of presenting various to-be-presented effect images, displaying the preset effect interface is to ensure that the display interface displays a frame with substantial content all the time, which may be understood as avoiding displaying frames with empty content to the user.

In the process of practical application, an effect interface may also be constructed in advance based on specific dates or various festivals throughout the year. Similar to the static image with the text "Happy New Year" in the foregoing example, the constructed effect interface similarly includes logos or statements associated with specific dates or the various festivals. Based on this, when it is detected that the effect prop, such as a calendar effect prop is triggered, a specific date or festival of the current moment may be determined based on the terminal device, and after the specific date or festival is determined, the corresponding effect interface constructed in advance can be retrieved to be displayed on the display interface.

In this embodiment, if there is no preset effect interface for the specific dates or festivals, only one universal image may be stored as an effect interface. Based on this, regardless of the moment or the manner used by the user to trigger the effect prop, such as the calendar effect prop, the display interface always displays the universal effect interface. This method can effectively save storage resources of the user terminal device. The universal effect interface may be an interface including words such as "Reversal of Fortune" or "Turn of Luck."

It should be understood that in addition to presetting the universal effect interface, the user may also input a plurality of images to the application in advance so as to generate corresponding effect interfaces, or upload the plurality of images to a server side associated with the application, such that the server side constructs an expected effect image based on these images. Based on this, when it is detected that the user triggers the target page turning effect, the application may retrieve the corresponding image from the plurality of preset effect images according to actual needs of the user. Or, one or more effect images issued from the server side are received based on a data transmission interface, and after an effect interface is determined, the effect interface is presented in the display interface. Through the method, the freedom of selecting the effect image is enhanced.

It should be noted that due to the generally high computing power of the terminal, various to-be-presented effect images may be determined within a short period of time. Therefore, it is also possible to set corresponding present pause conditions for the preset effect interface. In this embodiment, the preset present pause condition includes at least one of a present duration of the preset effect interface reaching a second present duration, determining at least one to-be-presented effect image, and detecting an operation of triggering the display of at least one to-be-presented effect image.

Continue to describe the three present pause conditions with the foregoing example, for the effect associated with the New Year's Day festival, a first preset effect interface pause method includes: a present duration of 1.5 s is preset for the static image with the text "Happy New Year", namely the second present duration; and when the actual present duration of the static image in the present interface reaches 1.5 s, the application software determines the current effect image, and hides the preset effect interface. A second preset effect interface pause method includes: in the process of displaying the preset effect interface, the application software may process related images in the background to determine one or more to-be-presented effect images needing to be displayed at presented, and when the above effect image is determined, the event may be taken as the present pause condition. A third preset effect interface pause method includes: a display control may be developed in the application software in advance, and when the operation of the user in triggering the display control is detected, the display of the preset effect interface may be paused. Those skilled in the art should understand that which method adopted to pause the preset effect interface should be selected according to actual needs of the user, which is not limited by this embodiment of the disclosure.

S220: a to-be-processed image is determined.

In this embodiment, there may be various methods for determining the to-be-processed image. How to determine the to-be-processed image is introduced below.

Method 1: an image collected when an effect is triggered is taken as the to-be-processed image For example, when the user performs the effect trigger operation, the user is photographed based on the camera device on the terminal device, thereby taking the captured image as the to-be-processed image.

Method 2: an image collected when it is detected that the present moment of the preset effect interface satisfies the preset present pause condition is taken as the to-be-processed image.

For example, the preset present pause condition may be 1.5 s. The preset effect interface may be presented after triggering the effect prop. After detecting that the present duration of the preset effect interface reaches 1.5 s, the to-be-processed image is collected based on the camera device on the terminal device.

Alternatively, in practical application, in the process of displaying the preset effect interface, the camera device of the terminal device records frames including facial information of the user in real time and generates a corresponding video, and the to-be-processed image is determined based on the generated video.

Method 3: an image periodically collected based on the camera device is taken as to-be-processed image.

For example, the camera device of the terminal device may periodically collect frames including a target user, such as capturing one image for the target user at the interval of 1 second, and then one of the collected images is determined as the to-be-processed image based on a preset screening rule or a selection result of the user for the plurality of captured images.

Method 4: an image determined from a received target video is taken as to-be-processed image.

For example, the target video uploaded by the user through the application software or application may be first received, and then one specific frame is determined from the target video as the to-be-processed image according to a manual selection operation of the user or the preset image screening rule. It should be noted that in the practical application process, the determined to-be-processed image is not limited to one image in the foregoing example, and a plurality of images may also be directly determined as to-be-processed images, which will not be repeated in this embodiment of the disclosure.

S230: at least one to-be-presented effect image is determined based on the to-be-processed images.

For example, first effect processing is performed on the to-be-processed images to obtain to-be-fused images; and based on present types corresponding to the to-be-fused images, effect processing is performed on the corresponding to-be-fused images to obtain at least one to-be-presented effect image.

The to-be-fused image refers to an image obtained after performing preliminary processing on the to-be-processed image based on a specific model. It should be understood that each to-be-fused image is not assigned with a corresponding page turning visual effect. Correspondingly, the process of processing the image by the model is a process of first effect processing. The first effect may be one or more filters applied to the to-be-processed image, and may also be a new visual effect generated after processing the content of the to-be-processed image from visual display, and the process is described below.

For example, the to-be-processed images may be inputted to a pre-trained first effect processing model to be processed. The functions of the first effect processing model may include cartoonizing the to-be-processed image, may also include adding a layer of beauty effect to the to-be-processed image, and may further include a plurality of filters for image processing, etc. Those skilled in the art should understand that the first effect processing model may include only one of the above functions, and in this case, the obtained to-be-fused image only undergoes one type of change. The first effect processing model may also include a plurality of functions at the same time, and in this case, the model respectively performs cartoonization processing, beauty optimization processing, and addition of corresponding filters on the inputted to-be-processed image to finally output the to-be-fused image. It should be noted that when the first effect processing model includes the plurality of functions, each function may be implemented based on a corresponding sub-model in the first effect processing model, such as a cartoonization processing sub-model, a beauty optimization processing sub-model, and a filter model.

After the to-be-fused image is obtained, the present type of the to-be-fused image may be determined based on the image present mode; based on the present type, target effect images corresponding to two adjacent to-be-fused images are determined when the target page turning effect is performed; and based on the to-be-fused images and the target effect images, at least one to-be-presented effect image is determined.

The present type includes a static present type and/or a dynamic present type. The static present type refers to an image type of the to-be-presented effect image continuously presented on the display interface before detecting trigger of the page turning condition and after the previous page turning. Correspondingly, the dynamic present type refers to a present type corresponding to the two adjacent to-be-presented effect images when the page turning condition is satisfied.

Exemplarily, after the present type of the to-be-fused image is determined, the target effect image may be determined based on the page turning condition. For example, the two adjacent to-be-presented effect images before and after satisfying the page turning condition are taken as target effect images, that is, the image displayed before page turning and the image displayed after page turning are the target effect images.

In this embodiment, the target page turning effect is constructed based on at least three to-be-used stickers, and the to-be-used sticker may be a patch in the three-dimensional space. The patch refers to a quad mesh in application software supporting effect image processing, which may be understood as an object for carrying effect images in the application software. Each patch is composed of two triangles, and correspondingly, one patch includes 12 vertexes, a front face, and a back face, which may be understood that the front face and the back face of the patch both include 6 vertexes. In this embodiment, in order to display the dynamic page turning effect in the subsequent process of presenting the plurality of effect images, the three determined patches may be deployed in the three-dimensional space in a calendar form, which may be understood that the front faces and the back faces of the two patches are attached, and meanwhile a third patch is linked to bottom edges of the two patches. The process of constructing the target effect images based on the to-be-used stickers is described below.

Figure 3:
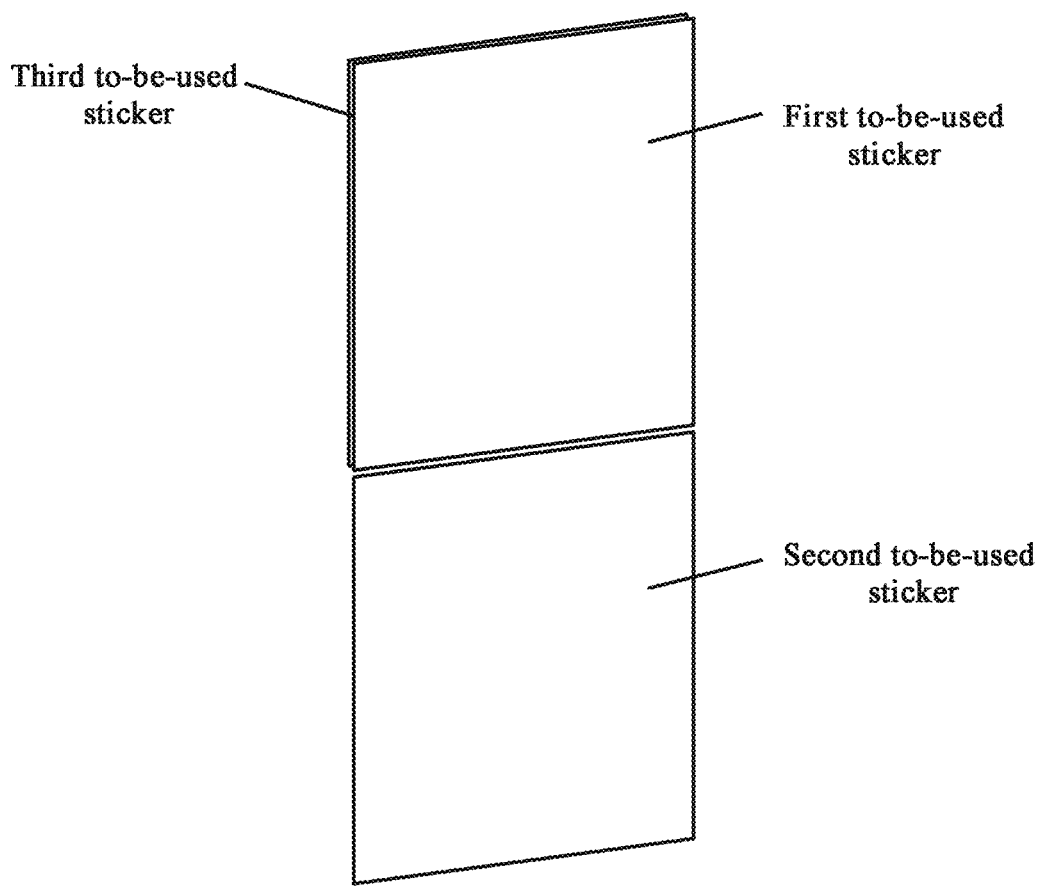
FIG. 3 illustrates at least three to-be-used stickers in a three-dimensional space according to Embodiment 2 of the disclosure.

When the target effect images are constructed, two target to-be-used stickers used by two adjacent to-be-fused images during execution of the target page turning effect, and relative orientation information between front faces and back faces of at least two target to-be-used stickers and a rendering camera are first determined; then, the to-be-fused images are mapped to the target to-be-used stickers consistent with the relative orientation information according to corrected vertex attribute information of the at least two target to-be-used stickers to obtain the target effect images; finally, based on timestamps of the to-be-fused images, a plurality of fused effect image groups matched with the corresponding target effect images are determined; and based on the plurality of fused effect image groups and the corresponding target effect images, a to-be-presented effect image is determined. The process is described with reference to FIG. 3 below.

In this embodiment, because switchover and present between the two effect images are involved in subsequent execution of the target page turning effect, the to-be-used stickers need to be first assigned to the two to-be-fused images in the three-dimensional space. In the practical application process, to display the visual effect of calendar turning, the three to-be-used stickers may be first deployed in the three-dimensional space, namely a first to-be-used sticker, a second to-be-used sticker, and a third to-be-used sticker shown in FIG. 3. For example, the at least three to-be-used stickers are used for cyclically carrying target effect images. One target effect image is mapped to the front face of the first to-be-used sticker and the back face of the second to-be-used sticker. The other target effect image is mapped to the back face of the first to-be-used sticker and the front face of the third to-be-used sticker, and the front face of the third to-be-used sticker overlaps with the back face of the third to-be-used sticker. Various to-be-presented effect images in to-be-fused image groups sequentially replace the target effect images on the to-be-used stickers. It should be understood that when the three to-be-used stickers are deployed in the three-dimensional space and the first to-be-used sticker is turned, the visual effect of calendar turning can be displayed. The effect images determined after the target effect image and before the next target effect image may be sequentially displayed on the target effect image, and in this case, page turning is not performed.

Meanwhile, the rendering camera also exists in the three-dimensional space and is at least configured to render one face of the collected sticker, and therefore it should be understood that there is a specific position association relationship between the sticker on each side and the rendering camera in the three-dimensional space. For example, the front face of the first to-be-used sticker and the back face of the second to-be-used sticker are opposite to the rendering camera.

In this embodiment, each of a plurality of two-dimensional texture images on each to-be-used sticker is composed of three vertexes, and meanwhile these vertexes can be reflected in a UV texture space. Those skilled in the art should understand that when UVs are used as two-dimensional texture coordinate points residing at vertexes of a polygon mesh, a two-dimensional texture coordinate system is defined, and the coordinate system is the UV texture space. In this space, U and V are utilized for defining coordinate axes, which are configured to determine how to place one texture image on a surface of a three-dimensional model. That is, UVs provide a connection relationship between the model surface and the texture image, and is used for determining which vertex on the model surface a pixel point on the texture image should be placed, thereby allowing the entire texture to be mapped onto the model.

Based on this, it should be understood that in this embodiment, uv values denote vertex attribute information of the to-be-used stickers. Before the to-be-fused image is mapped to the corresponding to-be-used sticker, for the vertex attribute information of the first to-be-used sticker shown in FIG. 3, uv values from left to right correspond to 0 to 1, and uv values from top to bottom also correspond to 0 to 1. Meanwhile, in order to achieve the dynamic calendar page turning effect in the subsequent process, for the vertex attribute information of the second to-be-used sticker shown in FIG. 3, uv values from right to left correspond to 0 to 1, and uv values from bottom to top also correspond to 0 to 1. In the process of performing the mapping processing operation, if one image is mapped to one patch, there may be a case of image distortion, and a poor effect of page turning. The to-be-fused image may be mapped to two patches. In this case, the uv value of the above first to-be-used sticker needs to be modified to 0 to 0.5, and the uv value of the second to-be-used sticker in a vertical direction is modified to 0.5 to 1. The upper half part of the to-be-fused image is mapped to the first to-be-used sticker, and the lower half part of the to-be-fused image is mapped to the second to-be-used sticker. Based on this, it should be understood that although the to-be-fused image is formed by splicing the front face of the first to-be-used sticker and the back face of the second to-be-used sticker, the finally displayed content may be completely consistent with the original content of the to-be-fused image.

In an example, to avoid the case of image turning in the process of performing page turning, the uv value of the second to-be-used sticker may be modified to range from 1 to 0.5.

In an example, a plurality of fused effect image groups matched with corresponding target effect images are determined according to timestamps of the to-be-fused images, where the plurality of fused effect image groups are consistent with the target to-be-used stickers used by the corresponding target effect images and orientation information; and based on the plurality of fused effect image groups and the corresponding target effect images, the to-be-presented effect image is determined.

It should be understood that images between two adjacent target effect images satisfying the page turning condition are taken as the fused effect image group associated with the previous target effect image. The images in the fused effect image group are sequentially presented on the display interface according to timestamp information. If the image type of the to-be-presented effect images is the dynamic present type, each to-be-presented effect image is the target effect image.

S240: the at least one to-be-presented effect image is presented according to a preset image present mode.

S250: if it is detected that the page turning condition is satisfied in the present process, a target to-be-used sticker corresponding to the previous target effect image in adjacent target effect images is controlled based on a preset page turning perform program to turn by a target turning angle according to preset turning parameters so as to present the next target effect image.

Figure 4:
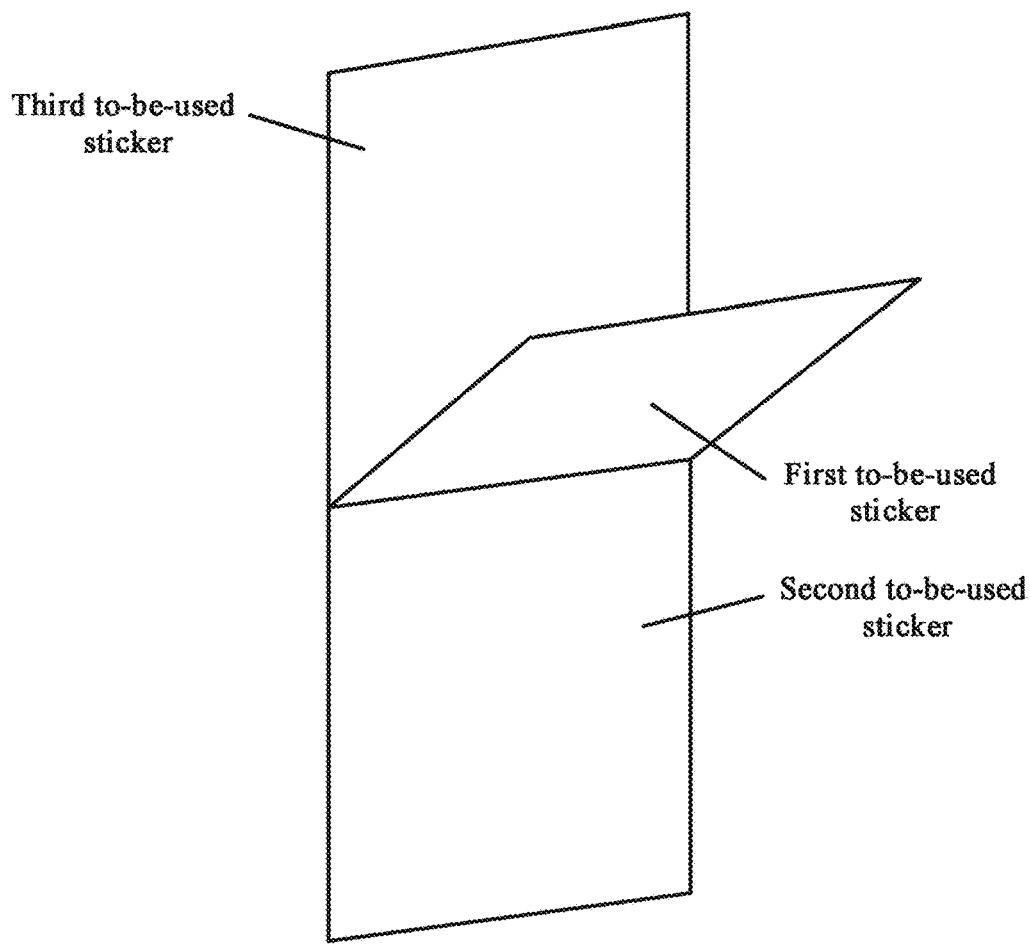
FIG. 4 illustrates a method of performing a page turning effect with the at least three to-be-used stickers according to Embodiment 2 of the disclosure.

In this embodiment, when the page turning operation is performed on the current displayed effect image based on the page turning perform program, the target to-be-used sticker may be turned by the target turning angle according to the preset turning parameters. In conjunction with FIG. 4, the process is described from the perspective of the three-dimensional space where the target to-be-used sticker is located below.

In this embodiment, in order to display the dynamic calendar page turning effect in the process of switching the current effect image with the next effect image, after the next effect image is also loaded on the first to-be-used sticker and the second to-be-used sticker, the target turning angle of the first to-be-used sticker and the second to-be-used sticker may be controlled based on the preset page turning perform program. The preset turning parameters include a turning angle and an expected duration corresponding to the target turning angle. It should be understood that the expected duration is used for controlling a turning speed of the first to-be-used sticker and/or the second to-be-used sticker. For example, when the range of the target turning angle of the first to-be-used sticker and the second to-be-used sticker is [0°, 180°] and the expected duration is 5 seconds, it indicates that the action of turning, with the bottom edge of the first to-be-used sticker as the axis, the first to-be-used sticker by 180° from top to bottom needs to be completed within 5 seconds, and meanwhile the action of turning, with the upper side edge of the second to-be-used sticker as the axis, the second to-be-used sticker by 180° from bottom to top also needs to be completed within 5 seconds.

In this embodiment, the front face of the first to-be-used sticker is attached to the back face of the third to-be-used sticker in the process of displaying the current effect image, an included angle between the first to-be-used sticker and the second to-be-used sticker is 180°, and meanwhile the target page turning effect is executed with an axial symmetry line of the to-be-presented effect image parallel to a horizontal plane as a turning axis. Based on this, when the first to-be-used sticker is downwards turned with the bottom edge of the first to-be-used sticker as the axis, the included angle between the back face of the first to-be-used sticker and the front face of the third to-be-used sticker continuously increases. Correspondingly, when the second to-be-used sticker is upwards turned with the upper side edge of the second to-be-used sticker as the axis, the included angle between the front face of the second to-be-used sticker and the back face of the third to-be-used sticker continuously decreases.

The turning process of the first to-be-used sticker is taken as an example. In the process of transforming the target turning angle of the first to-be-used sticker from 0° to 90°, the front face of the first to-be-used sticker, the front face of the third to-be-used sticker, and the back face of the second to-be-used sticker are displayed to the rendering camera at the same time; and when the target turning angle of the first to-be-used sticker is 90°, the front face of the third to-be-used sticker and the back face of the second to-be-used sticker are displayed to the rendering camera at the same time. In the process of transforming the target turning angle of the first to-be-used sticker from 90° to 180°, the back face of the first to-be-used sticker, the front face of the third to-be-used sticker, and the back face of the second to-be-used sticker are displayed to the rendering camera at the same time; and when the target turning angle of the first to-be-used sticker reaches 180°, it indicates that the execution of the turning operation is completed. It should be understood that when the target turning angle of the first to-be-used sticker reaches 180°, the second to-be-used sticker has been turned to top from bottom, and the front face of the second to-be-used sticker is attached to the back face of the third to-be-used sticker.

In this embodiment, because the next effect image is loaded to the front face of the third to-be-used sticker and the back face of the first to-be-used sticker, after execution of the page turning perform program is completed, the rendering camera may render the next effect image, thereby achieving the effect of switching the current effect image to the next effect image in the form of calendar page turning. Meanwhile, it should be noted that after the next effect image is taken as the current effect image and a third effect image is determined, the dynamic switching process between the current effect image and the third effect image may also be executed according to the above method, which will not be repeated in this embodiment of the disclosure.

It should be noted that the process of displaying the effect images in the display interface is implemented based on a graphics pipeline/rendering pipeline. The rendering pipeline may be understood as a rendering assembly line, which may convert data into a 2D image from a 3D scenario, and display the 2D image on a screen.

In this embodiment, before displayed the to-be-presented effect image, the preset effect interface is first presented, thereby further enhancing the interest of the effects and also guiding the operations of the user, or indirectly making the user clear whether the current selected effect meets the expectation. A plurality of effect trigger operations are preset, and the mode for to-be-presented effect images is determined, thereby enhancing flexibility of the effect image processing method. After the next effect image is mapped to the corresponding target to-be-used sticker, the first to-be-used sticker and the second to-be-used sticker are turned based on the preset page turning perform program, thereby achieving the effect of switching the current displayed effect image to the next effect image in the form of calendar page turning.

Embodiment 3

Figure 5:
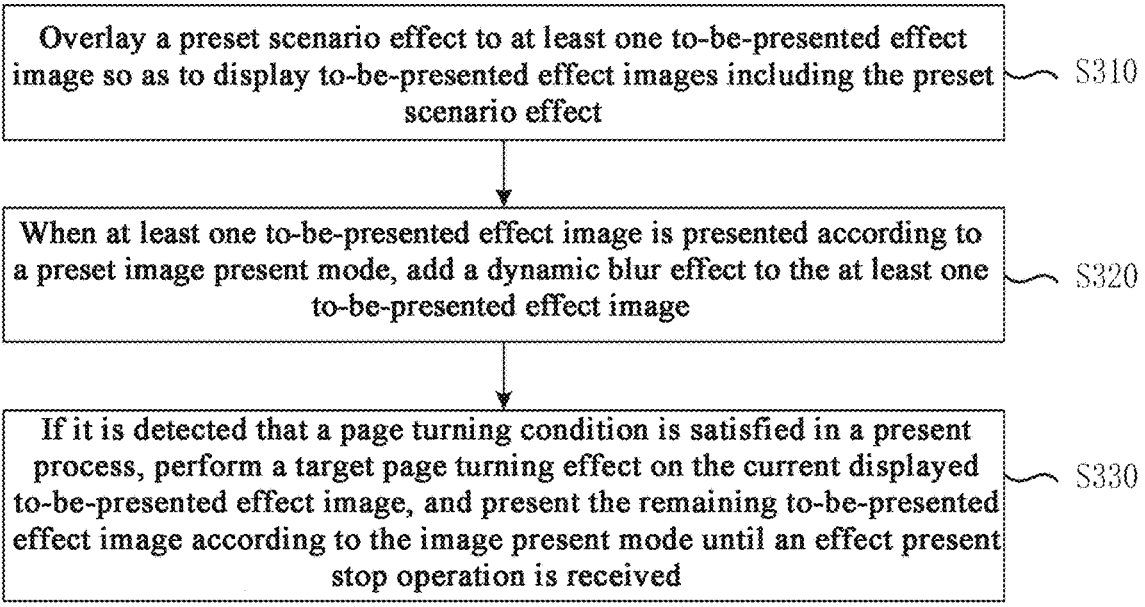
FIG. 5 is a schematic flowchart of an effect image processing method according to Embodiment 3 of the disclosure.

FIG. 5 is a schematic flowchart of an effect image processing method according to Embodiment 3 of the disclosure. Based on the foregoing embodiment, a blur effect may be further overlaid to various to-be-presented effect images, brightness can change when the two adjacent to-be-presented effect images are switched in the form of page turning, a effect display frame can be added for each to-be-presented effect image, and for a specific implementation, reference may be made to this embodiment. Technical terms that are the same with or corresponding to those in the foregoing embodiment are not repeated herein.

As shown in FIG. 5, the method includes the following steps:

S310: a preset scenario effect is overlaid to at least one to-be-presented effect image so as to display the to-be-presented effect images including the preset scenario effect.

In this embodiment, after the to-be-presented effect image is obtained in application software, to make the switching process between a preset effect interface and the to-be-presented effect image more natural, the preset scenario effect may also be overlaid to the to-be-presented effect image. The scenario effect may be a two-dimensional or three-dimensional visual effect pre-constructed in image processing software. The scenario effect may be static or dynamic. Meanwhile, the scenario effect may be overlaid to the effect images in real time in the process of presenting the to-be-presented effect images, the scenario effect may also be overlaid to the first to-be-presented effect image in advance, and an overlay method may be selected according to actual situations. For example, a dynamic and semi-transparent smoke effect is used as the preset scenario effect, and after the to-be-presented effect images are determined, the smoke effect is overlaid to the first to-be-presented effect image.

In the practical application process, the preset scenario effect may be presented when the preset effect interface is presented (e.g., an effect interface corresponding to the specific date or festival in Embodiment 2) and the pause present operation for the effect interface is detected. For example, after the display of an animation effect corresponding to the scenario effect is completed, the to-be-presented effect images may be presented. Through the method, the transition process between the effect interface and the to-be-presented effect image is more natural, thereby enhancing the interest and further improving the use experience of the user after selecting the effect of calendar page turning. Meanwhile, the scenario effect is not limited to the smoke effect in the foregoing example, which may also be a plurality of types of effects uploaded by the user. Meanwhile, similarly to the preset effect interface, the plurality of effects may be stored in a terminal device or a server side associated with applications, which is not limited in this embodiment of the disclosure.

Alternatively, in the process of presenting the to-be-presented effect images, the scenario effect is continuously presented on tops of the to-be-presented effect images. Meanwhile, in order to facilitate viewing of the to-be-presented effect images, the transparency of the scenario effect can be adjusted.

S320: when at least one to-be-presented effect image is presented according to a preset image present mode, a dynamic blur effect is added to the at least one to-be-presented effect image.

The blur effect refers to a blurry movement trace displayed by the two adjacent to-be-presented effect images based on a page turning action of the switched image during the execution of a target page turning effect. The blur effect is obtained by acquiring at least one frame of historical effect image before the corresponding moment during the present of the to-be-presented effect images, and performing blur processing on the at least one frame of historical effect image.

For example, in the process of presenting the to-be-presented effect images, the application may also determine timestamp information of the to-be-presented effect images, based on this, one or more to-be-presented effect images with timestamps before the timestamp of the current effect image may be determined, and the determined to-be-presented effect image is taken as a historical to-be-processed image. For example, for the four frames of to-be-presented effect images that are sequentially arranged according to the timestamp, when the fourth frame of effect image is presented on the display interface and the target page turning effect trigger operation is detected, the first three frames of to-be-presented effect images are historical effect images of the fourth frame of effect image. In the practical application process, to enhance the visual effect of the blur effect, for example, the three frames of images with the timestamps before the timestamp of the current effect image may be selected as historical to-be-processed images.

For example, after at least one historical effect image is determined, blur processing may be performed on the historical effect image. In the practical application process, an AlphaBlend function may be called to blur the image. Those skilled in the art should understand that parameters of the function point to a target device environment or handle, which is used for displaying an image with a specified transparency.

In the process of performing blur processing on the historical effect images, for example, transparency information of at least one frame of historical effect image is determined, and persistence effect information is determined based on the transparency information and corresponding weight values; and based on the persistence effect information, a blur effect is determined.

The transparency information is expressed as a percentage. Through the transparency information, the stage between an image and a transparent color may be divided into 100 parts. It should be understood that when the transparency value is low, the effect displayed by the image tends to be opaque, and when the transparency value is high, the effect displayed by the image tends to be transparent. Meanwhile, in order to blend a historical effect image as a source bitmap with other historical effect images and/or a current effect image based on an alpha channel and a SourceConstantAlpha field of each pixel in the image after calling the AlphaBlend function, weight values of the historical effect images also need to be determined based on the application software. It should be understood that when the weight values of the transparency information of the historical effect images are different, the displayed transparent effects will also differ. After the transparency information and corresponding weight values of the historical effect images are determined, the persistence effect information may be generated based on the images, where the persistence effect information may be understood as information that displays a visual persistence effect to the user during the display of at least three historical effect images.

In this embodiment, after the persistence effect information is generated based on the at least three historical effect images, a blur effect specific to the current effect image may be obtained. For example, the blur effect is overlaid to the current effect image. Those skilled in the art should understand that the overlay operation, as a blending processing mode in the computer graphics processing process, involves color blending, channel blending, and layer blending, which will not be further described in this embodiment of the disclosure.

By overlaying the blur effect to each to-be-presented effect image, when the page turning operation is performed on the current displayed effect image, the page turning action of the image may be visually more continuous, thereby reducing sharpness generated in the subsequent page turning process of the target to-be-used stickers in the three-dimensional space.

S330: if it is detected that a page turning condition is satisfied in the present process, the target page turning effect is performed on the current displayed to-be-presented effect image, the remaining to-be-presented effect image is presented according to the image present mode until an effect present stop operation is received.

For a calendar in reality, in the process of turning two adjacent pages, some content in the pages may be obscured or shadowed. Therefore, in this embodiment, in order to make a visual effect displayed by the two adjacent to-be-presented effect images more realistic in the page turning process, when the target page turning effect is performed on the current displayed to-be-presented effect image, brightness values of the two to-be-used stickers at different turning angles corresponding to the current to-be-presented effect image are determined, such that when the to-be-used stickers corresponding to the current to-be-presented effect image are turned, part of the to-be-presented effect image is adjusted to a corresponding brightness value, thereby producing a realistic shadow effect in a corresponding region of the effect image.

For example, after the current effect image and the next effect image are both mapped to the corresponding target to-be-used stickers, different regions of the target to-be-used stickers may be divided according to a preset rule, and target regions are determined. The process may also be understood as division of different regions of the two effect images. Meanwhile, a brightness variation rule is preset for each region of the target to-be-used stickers, where the brightness variation rule characterizes association information between the brightness values of the target regions and different turning angles of the target to-be-used stickers. Based on this, when the page turning operation is performed on the current effect image, the current turning angle of the target to-be-used sticker may be first determined. For example, brightness values corresponding to the current turning angle are determined for the target regions based on the preset brightness variation rule, and the target regions are controlled to be presented according to the determined brightness values.

Taking the process of downwards turning the first to-be-used sticker as an example, when the turning angle of the first to-be-used sticker is [0°, 90°], for the third to-be-used sticker originally located on the back face of the first to-be-used sticker, the brightness values of the target regions on the front face of the third to-be-used sticker continuously increase, such that the front face of the third to-be-used sticker overall displays a visual effect of constant changing from dark to light, which should be understood, from the perspective of the user, as a process where the shadow cast by the first to-be-used sticker on the third to-be-used sticker gradually becomes lighter. When the turning angle of the first to-be-used sticker is [90°, 180°], for the second to-be-used sticker with the back face towards the rendering camera, the brightness values of the target regions continuously decrease, such that the back face of the second to-be-used sticker overall displays a visual effect of constant changing from light to dark, which may be understood, from the perspective of the user, as a process where the shadow cast by the first to-be-used sticker on the second to-be-used sticker gradually becomes darker.

Through the method, the to-be-presented effect images may be processed by a central processing unit (CPU) layer. In other words, in the dynamic switching process of the to-be-presented effect images, the brightness values of the plurality of target regions in the to-be-presented effect images are constantly changed based on the CPU layer, thereby enhancing the reality of the page turning effect.

In the practical application process, to further enrich the frame content, the to-be-presented effect image may also be presented in the preset effect display frame. The effect display frame may be understood as a digital simulation of various photo frames or picture frames in reality in the three-dimensional space. For example, a metal-like photo frame is simulated in the three-dimensional space, and the to-be-presented effect image is deployed in the enclosing frame to be presented.

In the process of presenting the effect image through the effect display frame, there may be a case that the to-be-presented effect image and the effect display frame are not aligned, and therefore to avoid this case, the to-be-presented effect image needs to be further processed before the effect image and the effect display frame are integrated and displayed. For example, target display information of the to-be-presented effect image in the effect display frame is determined; and the to-be-presented effect image is updated based on the target display information and the effect display frame, thereby presenting the to-be-presented effect image in the effect display frame. Through the method, the to-be-presented effect image may be aligned and presented in the effect display frame. The process is described below.

In the process of determining the target display information, because the effect display frame is composed of two patches in a normalized device coordinates (NDC) space, first coordinate information of vertexes in the two patches forming the effect display frame needs to be first determined, that is, vertex coordinates of two triangles of one of the patches are determined. The determined vertex coordinates are NDC space coordinates. The coordinates refer to coordinates obtained by performing perspective division or homogeneous division based on a homogeneous clipping space. For example, second coordinate information of the vertexes is determined based on a model matrix, a view matrix, and a projection matrix. That is, in a vertex shader of the patch, homogeneous coordinates of the vertexes are multiplied by the above three matrices on the left. Through the calculation, the three-dimensional model may be mapped to two-dimensional coordinates corresponding to the screen, and a calculated result is taken as the second coordinate information of the vertexes, namely position information of the vertexes in the clipping space.

In an example, a center point coordinate of the to-be-presented effect image is determined. Based on the center point coordinate and the second coordinate information, a coordinate offset is determined. Based on the coordinate offset, corresponding target vertex attribute information of the vertexes in the to-be-presented effect images is determined, and the target vertex attribute information is taken as target display information. For example, in the first to-be-used sticker and the second to-be-used sticker carrying the to-be-presented effect image, a connecting line at a joint of the two to-be-used stickers may be determined (i.e., the bottom edge of the first to-be-used sticker, or the upper side edge of the second to-be-used sticker), and a midpoint of the connecting line is taken as the center point of the effect image. In an example, coordinates of the center point in the three-dimensional space are determined, and a coordinate offset between the coordinates and second coordinates of the two patches associated with the effect display frame are determined. It should be understood that the determined coordinate offset is at least used for adjusting the coordinates of the vertexes of the to-be-presented effect image, or determining new coordinates of the vertexes of the to-be-presented effect image. In an example, a uv value of a target vertex of the to-be-presented effect image is determined based on the coordinate offset, and the determined uv value is taken as target display information of the effect image.

In this embodiment, after the target display information of the to-be-presented effect images in the effect display frame is determined, in the process of updating the to-be-presented effect images based on the target display information and the effect display frame, for example, the corresponding to-be-presented effect images are projected to corresponding canvases in the effect display frame based on the target display information so as to update the to-be-presented effect images; and the updated to-be-presented effect images are presented. It should be understood that based on the uv values of the vertexes of the to-be-presented effect image, the image is projected to the corresponding canvas of the effect display frame, an operation result is taken as the updated to-be-presented effect image, and when the effect image is displayed on the corresponding display interface of the application software, a visual effect that the to-be-presented effect image is completely enclosed by the effect display frame can be displayed.

It should be noted that for the above-mentioned blur effect overlay processing, brightness value control processing, and effect display frame overlay processing, optimization effects may be separately reflected in the display process of the to-be-presented effect images, or may be combined and reflected in the display process of the to-be-presented effect images, which is not limited in this embodiment of the disclosure. It should be understood that in the process of presenting the effect images overlaid with the above three optimization effects, the two adjacent to-be-presented effect images perform the page turning effect in the preset effect display frame, meanwhile, the blur effect is displayed in the page turning process, and realistic-like shadows are generated in the corresponding regions of the images.

In this embodiment, by overlaying the blur effect to the current presented to-be-presented effect image, when the page turning operation is performed on the current presented effect image, the image page turning action is visually more continuous, thereby reducing sharpness generated during the subsequent page turning process of the target to-be-used stickers in the three-dimensional space. Meanwhile, in the dynamic switching process of the effect images, the brightness values of the plurality of target regions in the effect images are constantly changed based on the CPU layer, thereby enhancing the reality of the page turning effect, that is, generating the realistic-like shadows in the specific regions of the images in the page turning process; and the to-be-presented effect images are presented in the preset effect display frame, thereby further enriching the present content, and improving the use experience of the user after selecting the page turning effect.

Embodiment 4

Figure 6:
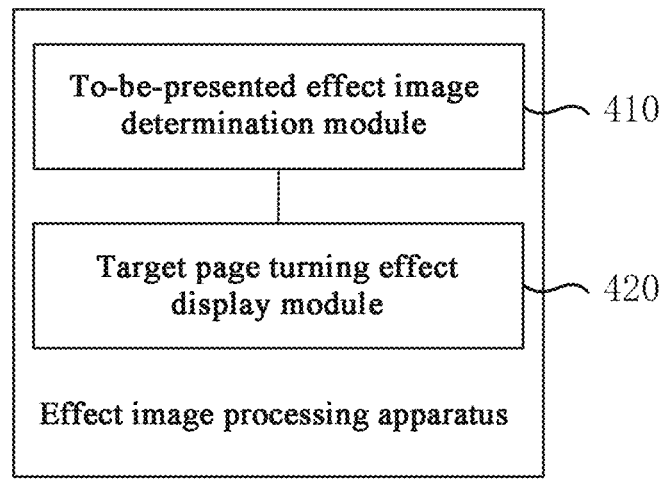
FIG. 6 is a structural block diagram of an effect image processing apparatus according to Embodiment 4 of the disclosure.

FIG. 6 is a structural block diagram of a effect image processing apparatus according to Embodiment 4 of the disclosure. The effect image processing apparatus may execute the effect image processing method provided by any embodiment of the disclosure, and has corresponding functional modules and effects for executing the method. As shown in FIG. 6, the apparatus includes: a to-be-presented effect image determination module 410 and a target page turning effect present module 420.

The to-be-presented effect image determination module 410 is configured to, in response to an effect trigger operation, determine at least one to-be-presented effect image, and present the at least one to-be-presented effect image according to a preset image present mode.

The target page turning effect present module 420 is configured to, in response to detecting that a page turning condition is satisfied in a present process, perform a target page turning effect on a current displayed to-be-presented effect image, and present the remaining to-be-presented effect image according to the image present mode until an effect present stop operation is received.

Based on the foregoing embodiments, the effect trigger operation includes at least one of the following: triggering a page-turning effect prop; monitored voice information including an effect addition instruction; and detecting that a present interface includes a facial image.

Based on the foregoing embodiments, the image present mode includes at least one of the following: before detecting that the page turning condition is satisfied, sequentially presenting at least one to-be-presented effect image according to a preset time interval; and continuously presenting one of the to-be-presented effect images, and when it is detected that the page turning condition is satisfied, the next to-be-presented effect image being presented.

Based on the foregoing embodiments, the page turning condition includes at least one of the following: the continuous present duration of each to-be-presented effect image reaching a first present duration; the number of the continuously presented to-be-presented effect images reaching a preset number threshold; and the continuous present duration of the current to-be-presented effect image reaching the first present duration.

Based on the foregoing embodiments, the effect image processing apparatus further includes a preset effect interface present module.

The preset effect interface display module is configured to present a preset effect interface on the display interface so as to present the at least one to-be-presented effect image according to the image present mode when a present moment of the preset effect interface satisfies a preset present pause condition. The preset effect interface is a static effect interface or a dynamic effect interface, and the preset effect interface includes preset texts and preset images. The preset present pause condition includes at least one of a present duration of the preset effect interface reaching a second present duration, determining the at least one to-be-presented effect image, and detecting an operation of triggering the present of the at least one to-be-presented effect image.

Based on the foregoing embodiments, the to-be-presented effect image determination module 410 includes a to-be-presented effect image determination unit.

The to-be-presented effect image determination unit is configured to take an image collected when an effect is triggered as the to-be-processed image; take an image collected, as the to-be-processed image, in response to detecting that a present moment of a preset effect interface satisfies a preset present pause condition; or take an image periodically collected based on a camera device as the to-beprocessed image; or take an image determined from a received target video as the to-be-processed image; perform first effect processing on the to-be-processed images to obtain to-be-fused images; and perform, based on present types corresponding to the to-be-fused images, effect processing on the corresponding to-be-fused images to obtain the at least one to-be-presented effect image.

Optionally, the to-be-presented effect image determination unit is further configured to determine the present type of the to-be-fused images according to the image present mode, where the present type includes a static present type and/or a dynamic present type. Based on the present type, target effect images corresponding to the two adjacent to-be-fused images are determined when the target page turning effect is performed; and based on the to-be-fused images and the target effect images, the at least one to-be-presented effect image is determined.

Based on the foregoing embodiments, the target page turning effect is constructed based on at least three to-be-used stickers.

Optionally, the to-be-presented effect image determination unit is further configured to determine two target to-be-used stickers used by two adjacent to-be-fused images when the target page turning effect is performed and relative orientation information between front faces and back faces of the at least two target to-be-used stickers and a rendering camera; and map the to-be-fused images to the target to-be-used stickers consistent with the relative orientation information according to corrected vertex attribute information of the at least two target to-be-used stickers to obtain the target effect images.

Optionally, the to-be-presented effect image determination unit is further configured to determine a plurality of fused effect image groups matched with corresponding target effect images according to timestamps of the to-be-fused images, where the plurality of fused effect image groups are consistent with the target to-be-used stickers used by the corresponding target effect images and orientation information; and determine the to-be-presented effect image based on the plurality of fused effect image groups and the corresponding target effect images.

Based on the foregoing embodiments, the at least three to-be-used stickers are used for cyclically carrying the target effect images. One target effect image is mapped to the front face of the first to-be-used sticker and the back face of the second to-be-used sticker. The other target effect image is mapped to the back face of the first to-be-used sticker and the front face of the third to-be-used sticker, the front face of the first to-be-used sticker and the back face of the second to-be-used sticker are opposite to the rendering camera, and the front face of the third to-be-used sticker overlaps with the back face of the third to-be-used sticker. The to-be-presented effect images in to-be-fused image groups sequentially replace the target effect images on the to-be-used stickers.

Optionally, the target page turning effect present module 420 is further configured to control a target to-be-used sticker corresponding to the previous target effect image in adjacent target effect images based on a preset page turning perform program to turn by a target turning angle according to preset turning parameters so as to present the next target effect image.

Based on the foregoing embodiments, the preset turning parameters include a turning angle and an expected duration corresponding to the target turning angle.

Based on the foregoing embodiments, the effect image processing apparatus further includes a preset scenario effect overlay module.

The preset scenario effect overlay module is configured to overlay a preset scenario effect to the at least one to-be-presented effect image so as to present the to-be-presented effect images including the preset scenario effect.

Based on the foregoing embodiments, the effect image processing apparatus further includes a blur effect processing module.

The blur effect processing module is configured to add a blur effect to the to-be-presented effect images during the present of the to-be-presented effect images, where the blur effect is obtained by acquiring at least one frame of historical effect image before the corresponding moment during the present of the to-be-presented effect images, and performing blur processing on the at least one frame of historical effect image.

Optionally, the blur effect processing module is further configured to determine transparency information of the at least one frame of historical effect image, and determine persistence effect information based on the transparency information and corresponding weight values; and determine the blur effect based on the persistence effect information.

Based on the foregoing embodiments, the effect image processing apparatus further includes a brightness value adjustment module.

The brightness value adjustment module is configured to determine brightness values corresponding to two to-be-used stickers at different turning angles corresponding to the current displayed to-be-presented effect image when a target page turning effect is performed on the current displayed to-be-presented effect image, such that when the to-be-used stickers corresponding to the current displayed to-be-presented effect image are turned, a part of the to-be-presented effect image is adjusted to a corresponding brightness value.

Based on the foregoing embodiments, the effect image processing apparatus further includes an effect display frame processing module.

The effect display frame processing module is configured to present the to-be-presented effect image in a preset effect display frame.

Based on the foregoing embodiments, the effect display frame processing module includes a target display information determination unit and an image update unit.

The target display information determination unit is configured to determine target display information of the to-be-presented effect image in the effect display frame.

The image update unit is configured to update the to-be-presented effect image based on the target display information and the effect display frame so as to present the to-be-presented effect image in the effect display frame.

Based on the foregoing embodiments, the effect display frame is composed of two patches.

Optionally, the target display information determination unit is further configured to determine first coordinate information of vertexes of the two patches and determine second coordinate information of the vertexes based on a model matrix, a view matrix, and a projection matrix; determine center point coordinates of the to-be-presented effect image; determine a coordinate offset based on the center point coordinates and the second coordinate information; and determine, based on the coordinate offset, corresponding target vertex attribute information of the vertexes in the to-be-presented effect image, and take the target vertex attribute information as the target display information.

Optionally, the image update unit is further configured to project the corresponding to-be-presented effect images to corresponding canvases in the effect display frame based on the target display information so as to update the to-be-presented effect images; and present the updated to-be-presented effect images.

Based on the foregoing embodiments, the target page turning effect is performed with an axial symmetry line of the to-be-presented effect image parallel to a horizontal plane as a turning axis.

In this embodiment, at least one to-be-presented effect image can be determined in response to the effect trigger operation, and the at least one to-be-presented effect image is presented according to the preset image present mode; and if it is detected that the page turning condition is satisfied in the present process, the target page turning effect is performed on the current displayed to-be-presented effect image, the remaining to-be-presented effect image is presented according to the image present mode until the effect present stop operation is received. Props for the effect present are enriched. When the user uses the effect prop, the plurality of effect images can be processed, and the visual effect of page turning is displayed in the effect image switching process, thereby enhancing the richness and interest of the frame content, and also improving an effect of interaction with the user.

The effect image processing apparatus provided by this embodiment of the disclosure can execute the effect image processing method provided by any embodiment of the disclosure, and has the corresponding functional modules and beneficial effects for executing the method.

It should be noted that the various units and modules included in the apparatus are only divided according to functional logics, but are not limited to the above division, as long as the corresponding functions can be achieved; and in addition, the specific names of the functional units are only for the convenience of distinguishing each other, and do not limit the scope of protection of the embodiments of the disclosure.

Embodiment 5

Figure 7:
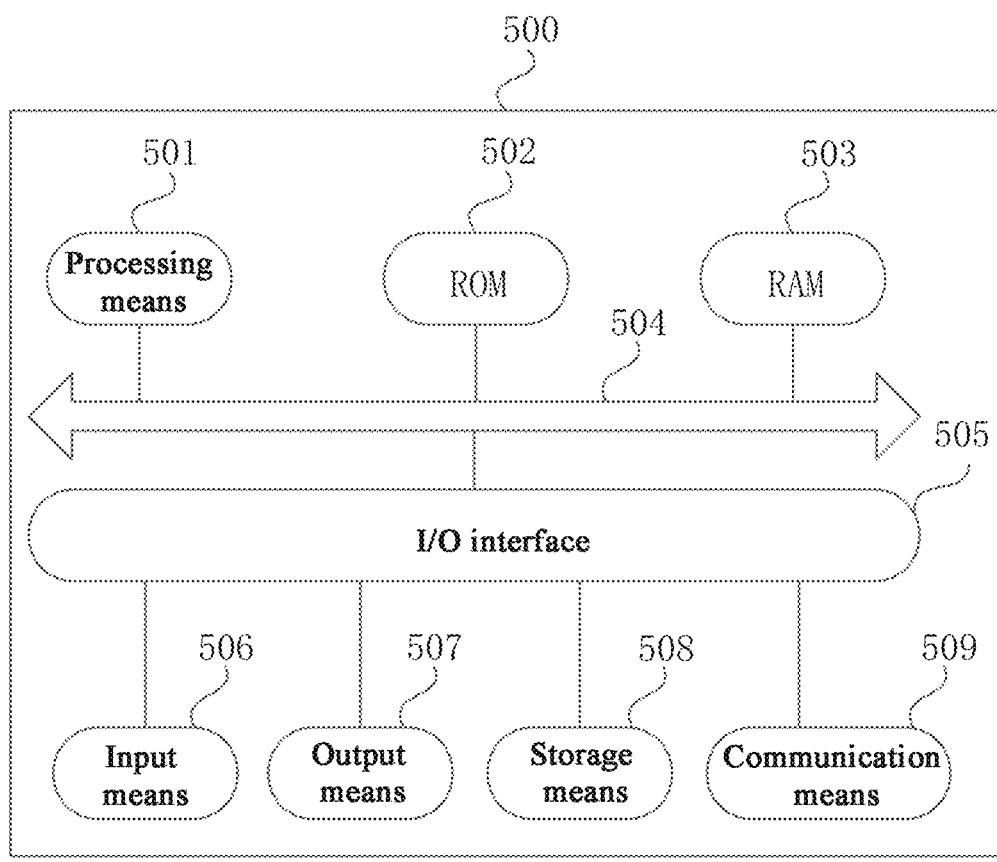
FIG. 7 is a structural schematic diagram of an electronic device according to Embodiment 5 of the disclosure.

FIG. 7 is a structural schematic diagram of an electronic device according to Embodiment 5 of the disclosure. Referring to FIG. 7 as below, FIG. 7 illustrates a structural schematic diagram of an electronic device (e.g., a terminal device or a server in FIG. 7) 500 applicable to implementing embodiments of the disclosure. The terminal device in this embodiment of the disclosure may include but not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital television (TV) and a desk computer. The electronic device shown in FIG. 7 is merely an example, which should not impose any limitations on functions and application ranges of this embodiment of the disclosure.

As shown in FIG. 7, the electronic device 500 may include a processing means (e.g., a central processing unit and a graphics processing unit) 501, which may perform various appropriate actions and processing according to programs stored on a read-only memory (ROM) 502 or loaded from a storage means 508 into a random access memory (RAM) 503. The RAM 503 further stores various programs and data required for the operation of the electronic device 500. The processing means 501, the ROM 502, and the RAM 503 are connected to one another through a bus 504. An input/output (I/O) interface 505 is also connected to the bus 504.

Typically, the following means may be connected to the I/O interface 505: an input means 506, including, for example, a touchscreen, a touchpad, a keyboard, a mouse, a camera, a microphone, an accelerometer, and a gyroscope; an output means 507, including, for example, a liquid crystal display (LCD), a speaker, and a vibrator; the storage means 508, including, for example, a magnetic tape and a hard drive; and a communication means 509. The communication means 509 may allow the electronic device 500 to be in wireless or wired communication with other devices for data exchange. Although FIG. 7 illustrates the electronic device 500 with various means, it should be understood that it is not necessary to implement or have all the shown means. Alternatively, more or fewer means may be implemented or provided.

Particularly, the foregoing process described with reference to the flowchart according to the embodiments of the disclosure may be implemented as a computer software program. For example, an embodiment of the disclosure includes a computer program product including a computer program carried on a non-transitory computer-readable medium. The computer program includes program code for executing the method shown in the flowchart. In this embodiment, the computer program may be downloaded and installed from the network by the communication means 509, or installed from the storage means 508, or installed from the ROM 502. The computer program, when executed by the processing means 501, performs the above functions limited in the method in this embodiment of the disclosure.

The names of messages or information exchanged between multiple apparatuses in the implementations of the disclosure are provided for illustrative purposes only, and are not intended to limit the scope of these messages or information.

The electronic device provided by this embodiment of the disclosure and the effect image processing method provided by the foregoing embodiment belong to the same inventive concept, and for technical details not described in detail in this embodiment, reference may be made to the foregoing embodiment. This embodiment and the foregoing embodiment have the same beneficial effects.

Embodiment 6

An embodiment of the disclosure provides a computer storage medium, storing a computer program. The program, when executed by a processor, implements the effect image processing method provided by the foregoing embodiment.

It should be noted that the computer-readable medium in the disclosure may be a computer-readable signal medium, or a computer-readable storage medium, or any combination thereof. For example, the computer-readable storage medium may include but not limited to: electrical, magnetic, optical, electromagnetic, infrared, or semiconductor systems, apparatuses, or devices, or any combination thereof. Examples of the computer-readable storage medium may include but not limited to: an electrical connection with one or more wires, a portable computer disk, a hard drive, a random access memory (RAM), a read-only memory (ROM), an erasable programmable read-only memory (EPROM or a flash memory), fiber optics, a portable compact disc read-only memory (CD-ROM), an optical storage device, a magnetic storage device, or any proper combination of the above. In the disclosure, the computer-readable storage medium may be any tangible medium including or storing a program, and the program may be used by an instruction execution system, apparatus, or device, or used in conjunction with the instruction execution system, apparatus, or device. However, in the disclosure, the computer-readable signal medium may include data signals propagated in a baseband or propagated as a part of a carrier wave, which carry computer-readable program code. The propagated data signals may have a plurality of forms, including but not limited to electromagnetic signals, optical signals, or any proper combination of the above. The computer-readable signal medium may be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including but not limited to a wire, an optical cable, radio frequency (RF), etc., or any proper combination of the above.

In some implementations, a client and a server can communicate using any currently known or future-developed network protocols such as a hyper text transfer protocol (HTTP), and may also be can be in communication connection with digital data in any form or medium (e.g., a communication network). For example, the communication network includes a local area network (LAN), a wide area network (WAN), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to:
  determine at least one to-be-presented effect image in response to a effect trigger operation, and present the at least one to-be-presented effect image according to a preset image present mode; and
  perform a target page turning effect on a current presented to-be-presented effect image in response to detecting that a page turning condition is satisfied in a present process, and present the rest of to-be-presented effect images according to the image present mode until an effect present stop operation is received.

The storage medium may be a non-transitory storage medium.

The computer program code for executing the operations of the disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may redisplay a module, a program segment, or a portion of code, and the module, program segment, or portion of code includes one or more executable instructions for implementing specified logical functions. It should be noted that in some alternative implementations, functions marked in the blocks may also occur in an order different from that marked in the accompanying drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the unit does not limit the unit in certain cases. For example, a first acquisition unit may also be described as a "unit for acquiring at least two Internet protocol addresses."

The functions described above in this specification may be at least partially executed by one or more hardware logic components. For example, exemplary hardware logic components that can be used include: a field programmable gate array (FPGA), an application specific integrated circuit (ASIC), an application specific standard product (ASSP), a system on chip (SOC), a complex programmable logic device (CPLD), etc.

In the context of the disclosure, a machine-readable medium may be a tangible medium that may contain or store a program, and the program may be used by the instruction execution system, apparatus, or device, or used in conjunction with the instruction execution system, apparatus, or device. The machine-readable medium may be a machine-readable signal medium or a machine-readable storage medium. The machine-readable medium may include but not limited to: electronic, magnetic, optical, electromagnetic, infrared, or semiconductor systems, apparatuses, or devices, or any proper combination of the above. Examples of the machine-readable storage medium may include: an electrical connection based on one or more wires, a portable computer disk, a hard drive, a random access memory (RAM), a read-only memory (ROM), an erasable programmable read-only memory (EPROM) or a flash memory, fiber optics, a portable compact disc read-only memory (CD-ROM), an optical storage device, a magnetic storage device, or any proper combination of the above.

According to one or more embodiments of the disclosure, Example 1 provides an effect image processing method. The method includes:
  in response to an effect trigger operation, determining at least one to-be-presented effect image, and presenting the at least one to-be-presented effect image according to a preset image present mode; and
  in response to detecting that a page turning condition is satisfied in a present process, performing a target page turning effect on a current displayed to-be-presented effect image, and presenting the remaining to-be-presented effect image from the at least one to-be-presented effect image according to the image present mode until an effect present stop operation is received.

According to one or more embodiments of the disclosure, Example 2 provides an effect image processing method, further including:

optionally, the effect trigger operation includes at least one of the following:

triggering a page-turning effect prop; monitored voice information including an effect addition instruction; and detecting that a display interface includes a facial image.

According to one or more embodiments of the disclosure, Example 3 provides an effect image processing method, further including:

optionally, the image present mode includes at least one of the following:

sequentially presenting the at least one to-be-presented effect image according to a preset time interval before detecting that the page turning condition is satisfied; or continuously presenting one of the at least one to-be-presented effect image, and presenting the next to-be-presented effect image in response to detecting that the page turning condition is satisfied.

According to one or more embodiments of the disclosure, Example 4 provides an effect image processing method, further including:

optionally, the page turning condition includes at least one of the following:

a continuous present duration of the at least one to-be-presented effect image reaching a first present duration;

a number of the continuously presented at least one to-be-presented effect image reaching a preset number threshold; or a continuous present duration of the current to-be-presented effect image reaching the first present duration.

According to one or more embodiments of the disclosure, Example 5 provides an effect image processing method, further including:

optionally, presenting a preset effect interface on a display interface, such that in response to determining that a present moment of the preset effect interface satisfies a preset present pause condition, the at least one to-be-presented effect image is presented according to the image present mode;

where the preset effect interface is a static effect interface or a dynamic effect interface, and the preset effect interface comprises a preset text and a preset image; and the preset present pause condition comprises at least one of the following:

a present duration of the preset effect interface reaching a second present duration;

determining the at least one to-be-presented effect image; or detecting an operation of triggering the display of the at least one to-be-presented effect image.

According to one or more embodiments of the disclosure, Example 6 provides an effect image processing method, further including:

optionally, taking an image collected when an effect is triggered as the to-be-processed image;

taking an image collected, as the to-be-processed image, in response to detecting that a present moment of a preset effect interface satisfies a preset present pause condition; or taking an image periodically collected based on a camera device as the to-be-processed image; or taking an image determined from a received target video as the to-be-processed image;

performing a first effect processing on each to-be-processed image to obtain to-be-fused images; and performing, based on a present type corresponding to each to-be-fused image, an effect processing on the corresponding to-be-fused image to obtain the at least one to-be-presented effect image.

According to one or more embodiments of the disclosure, Example 7 provides an effect image processing method, further including:

optionally, determining the present type of the to-be-fused image according to the image present mode, wherein the present type comprises at least one of a static present type or a dynamic present type;

determining, based on the present type, target effect images corresponding to two adjacent to-be-fused images when the target page turning effect is performed; and determining, based on the to-be-fused images and the target effect images, the at least one to-be-presented effect image.

According to one or more embodiments of the disclosure, Example 8 provides an effect image processing method, further including:

optionally, the target page turning effect is constructed based on at least three to-be-used stickers; and determining, based on the present type, the target effect images corresponding to the two adjacent to-be-fused images when the target page turning effect is performed includes:

determining two target to-be-used stickers used by the two adjacent to-be-fused images when the target page turning effect is performed and relative orientation information between front faces and back faces of the at least two target to-be-used stickers and a rendering camera; and mapping the to-be-fused image to a target to-be-used sticker consistent with the relative orientation information according to corrected vertex attribute information of the at least two target to-be-used stickers, to obtain the target effect image;

correspondingly, determining, based on the to-be-fused images and the target effect images, the at least one to-be-presented effect image includes: determining a plurality of fused effect image groups matched with the corresponding target effect images according to timestamps of the to-be-fused images, wherein the plurality of fused effect image groups are consistent with the target to-be-used stickers used by the corresponding target effect images and orientation information; and based on the plurality of fused effect image groups and the corresponding target effect images, determining the to-be-presented effect image.

According to one or more embodiments of the disclosure, Example 9 provides an effect image processing method, further including:

optionally, the at least three to-be-used stickers are used for cyclically carrying the target effect images, one of the target effect images is mapped to a front face of a first to-be-used sticker and a back face of a second to-be-used sticker, the other one of the target effect images is mapped to a back face of the first to-be-used sticker and a front face of a third to-be-used sticker, the front face of the first to-be-used sticker and the back face of the second to-be-used sticker are opposite to the rendering camera, and the front face of the third to-beused sticker overlaps with a back face of the third to-be-used sticker; and at least one to-be-presented effect image in the to-be-fused image groups sequentially replaces the target effect images on the to-be-used stickers.

According to one or more embodiments of the disclosure, Example 10 provides an effect image processing method, further including:
optionally, controlling, based on a preset page turning perform program, a target
to-be-used sticker corresponding to the previous target effect image in the adjacent target effect images to turn by a target turning angle according to a preset turning parameter, so as to present the next target effect image.

According to one or more embodiments of the disclosure, Example 11 provides an effect image processing method, further including:
optionally, the preset turning parameters include a turning angle and an expected duration corresponding to the target turning angle.

According to one or more embodiments of the disclosure, Example 12 provides an effect image processing method, further including:
optionally, overlaying a preset scenario effect to the at least one to-be-presented
effect image, so as to display at least one to-be-presented effect image comprising the preset scenario effect.

According to one or more embodiments of the disclosure, Example 13 provides an effect image processing method, further including:
optionally, when the to-be-presented effect images are presented, adding a blur effect
to the to-be-presented effect images,
where the blur effect is obtained by acquiring at least one frame of historical effect image before a corresponding moment during the present of each to-be-presented effect image, and performing a blur processing on the at least one frame of historical effect image.

According to one or more embodiments of the disclosure, Example 14 provides an
effect image processing method, further including:
optionally, determining transparency information of the at least one frame of historical effect image, and determining persistence effect information based on the transparency information and a corresponding weight value; and determining the blur effect based on the persistence effect information According to one or more embodiments of the disclosure, Example 15 provides an effect image processing method, further including:
optionally, determining brightness values corresponding to two to-be-used stickers at different turning angles corresponding to the current displayed to-be-presented effect image when a target page turning effect is performed on the current displayed to-be-presented effect image, such that when the to-be-used stickers corresponding to the current displayed to-be-presented effect image are turned, a part of the to-be-presented effect image is adjusted to a corresponding brightness value.

According to one or more embodiments of the disclosure, Example 16 provides an effect image processing method, further including:
optionally, presenting the to-be-presented effect image in a preset effect display frame.

According to one or more embodiments of the disclosure, Example 17 provides an effect image processing method, further including:
optionally, determining target display information of the to-be-presented effect image in the effect display frame; and
updating the to-be-presented effect image based on the target display information and the effect display frame, so as to present the to-be-presented effect image in the effect display frame.

According to one or more embodiments of the disclosure, Example 18 provides an effect image processing method, further including:
optionally, determining first coordinate information of a vertex of the two patches, and determining second coordinate information of the vertex based on a model matrix, a view matrix, and a projection matrix;
determining a center point coordinate of the to-be-presented effect image;
determining a coordinate offset based on the center point coordinate and the second coordinate information; and
determining, based on the coordinate offset, corresponding target vertex attribute information of the at least one vertex in the to-be-presented effect image, and taking the target vertex attribute information as the target display information.

According to one or more embodiments of the disclosure, Example 19 provides an effect image processing method, further including:
optionally, projecting the corresponding to-be-presented effect image to a corresponding canvas in the effect display frame based on the target display information, so as to update the to-be-presented effect image; and
presenting the updated to-be-presented effect image.

According to one or more embodiments of the disclosure, Example 20 provides an effect image processing method, further including:
optionally, the target page turning effect is performed with an axial symmetry line of the to-be-presented effect image parallel to a horizontal plane as a turning axis.

According to one or more embodiments of the disclosure, Example 21 provides an effect image processing apparatus, including:
a to-be-presented effect image determination module, configured to determine at least one to-be-presented effect image in response to an effect trigger operation, and present the at least one to-be-presented effect image according to a preset image present mode; and
a target page turning effect present module, configured to perform a target page turning effect on a current displayed to-be-presented effect image in response to detecting that a page turning condition is satisfied in a present process, and present the remaining to-be-presented effect image from the at least one to-be-presented effect image according to the image present mode until an effect present stop operation is received.

Those skilled in the art should understand that the scope of open in the disclosure is not limited to the embodiments formed by specific combinations of the above technical features, and should also cover other embodiments formed by arbitrary combinations of the above technical features or equivalent features without departing from the concept of the disclosure, such as embodiments formed by replacing the above features with the technical features with similar functions disclosed (but not limited to) in the disclosure.

Further, although the operations are described in a particular order, it should not be understood as requiring these operations to be performed in the shown particular order or in a sequential order. In certain environments, multitasking and parallel processing may be advantageous. Similarly, although several implementation details are included in the above discussion, these implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

Although the language specific to structural features and/or method logical actions is adopted to describe this subject, but it should be understood that the subject limited in the appended claims is not necessarily limited to the specific features or actions described above. On the contrary, the specific features and actions described above are merely examples for implementing the claims.

I claim:

1. An effect image processing method, comprising:
   in response to an effect trigger operation, determining at least one first effect image, and presenting the at least one first effect image according to a preset image present mode;
   in response to detecting that a page turning condition is satisfied in a present process, performing a page turning effect on a current displayed first effect image, and presenting a remaining first effect image from the at least one first effect image according to the image present mode until an effect present stop operation is received; and
   determining brightness values corresponding to two to-be-used stickers at different turning angles corresponding to the current displayed first effect image when a page turning effect is performed on the current displayed first effect image, such that when the to-be-used stickers corresponding to the current displayed first effect image are turned, a part of the first effect image is adjusted to a corresponding brightness value.

2. The method according to claim 1, wherein the effect trigger operation comprises at least one of the following:
   triggering a page turning effect prop;
   monitored voice information comprising an effect addition instruction; or
   detecting that a display interface comprises a facial image.

3. The method according to claim 1, wherein the image present mode comprises at least one of the following:
   sequentially presenting the at least one first effect image according to a preset time interval before detecting that the page turning condition is satisfied; or
   continuously presenting one of the at least one first effect image, and presenting a next first effect image in response to detecting that the page turning condition is satisfied.

4. The method according to claim 1, wherein the page turning condition comprises at least one of the following:
   a continuous present duration of the at least one first effect image reaching a first present duration;
   a number of the continuously presented at least one first effect image reaching a preset number threshold; or
   a continuous present duration of the current first effect image reaching the first present duration.

5. The method according to claim 1, further comprising:
   presenting a preset effect interface on a display interface, such that in response to determining that a present moment of the preset effect interface satisfies a preset present pause condition, the at least one first effect image is presented according to the image present mode;
   wherein the preset effect interface is a static effect interface or a dynamic effect interface, and the preset effect interface comprises a preset text and a preset image; and the preset present pause condition comprises at least one of the following:
   a present duration of the preset effect interface reaching a second present duration,
   determining the at least one first effect image, or
   detecting an operation of triggering the display of the at least one first effect image.

6. The method according to claim 1, wherein determining the at least one first effect image comprises:
   determining a to-be-processed image;
   performing a first effect processing on each to-be-processed image to obtain to-be-fused images; and
   performing, based on a present type corresponding to each to-be-fused image, an effect processing on the corresponding to-be-fused image to obtain the at least one first effect image; and
   wherein determining the to-be-processed image comprises:
   taking an image collected when an effect is triggered as the to-be-processed image;
   taking an image collected, as the to-be-processed image, in response to detecting that a present moment of a preset effect interface satisfies a preset present pause condition; or
   taking an image periodically collected based on a camera device as the to-be-processed image; or
   taking an image determined from a received target video as the to-be-processed image.

7. The method according to claim 6, wherein performing, based on the present type corresponding to each to-be-fused image, the effect processing on the corresponding to-be-fused image to obtain the at least one first effect image comprises:
   determining the present type of the to-be-fused image according to the image present mode, wherein the present type comprises at least one of a static present type or a dynamic present type;
   determining, based on the present type, target effect images corresponding to two adjacent to-be-fused images when the page turning effect is performed; and
   determining, based on the to-be-fused images and the target effect images, the at least one first effect image.

8. The method according to claim 7, wherein the page turning effect is constructed based on at least three to-be-used stickers, the at least three to-be-used stickers comprise the two to-be-used stickers, and determining, based on the present type, the target effect images corresponding to the two adjacent to-be-fused images when the page turning effect is performed comprises:
   determining two target to-be-used stickers used by the two adjacent to-be-fused images when the page turning effect is performed and relative orientation information between front faces and back faces of the at least target two to-be-used stickers and a rendering camera, wherein the two target to-be-used stickers used by the two adjacent to-be-fused images are from the at least three to-be-used stickers; and
   mapping the to-be-fused image to a target to-be-used sticker consistent with the relative orientation information according to corrected vertex attribute information of the at least two target to-be-used stickers, to obtain the target effect image; and wherein determining, based on the to-be-fused images and the target effect images, the at least one first effect image comprises:
   determining a plurality of fused effect image groups matched with the corresponding target effect images according to timestamps of the to-be-fused images, wherein the plurality of fused effect image groups are consistent with the target to-be-used stickers used by the corresponding target effect images and orientation information; and
   based on the plurality of fused effect image groups and the corresponding target effect images, determining the first effect image.

9. The method according to claim 8, wherein the at least three to-be-used stickers are used for cyclically carrying the target effect images, one of the target effect images is mapped to a front face of a first to-be-used sticker and a back face of a second to-be-used sticker, an other one of the target effect images is mapped to a back face of the first to-be-used sticker and a front face of a third to-be-used sticker, the front face of the first to-be-used sticker and the back face of the second to-be-used sticker are opposite to the rendering camera, and the front face of the third to-be-used sticker overlaps with a back face of the third to-be-used sticker; at least one first effect image in the to-be-fused image groups sequentially replaces the target effect images on the to-be-used stickers, and the first to-be-used sticker, the second to-be-used sticker and the third to-be-used sticker are from the at least three to-be-used stickers.

10. The method according to claim 9, wherein performing the page turning effect on the current displayed first effect image comprises:
   controlling, based on a preset page turning perform program, a target to-be-used sticker corresponding to a previous target effect image in the adjacent target effect images to turn by a target turning angle according to a preset turning parameter, so as to present a next target effect image, wherein the target to-be-used sticker corresponding to the previous target effect image is from the at least three to-be-used stickers; and
   wherein the preset turning parameter comprise a turning angle and an expected duration corresponding to the target turning angle.

11. The method according to claim 1, further comprising:
before presenting the at least one first effect image according to the preset image present mode,
   overlaying a preset scenario effect to the at least one first effect image, so as to display at least one first effect image comprising the preset scenario effect.

12. The method according to claim 1, further comprising:
during the present of the at least one first effect image, adding a blur effect to the at least one first effect image, wherein the blur effect is obtained by acquiring at least one frame of historical effect image before a corresponding moment during the present of each first effect image, and performing a blur processing on the at least one frame of historical effect image,
wherein the method further comprises:
   determining transparency information of the at least one frame of historical effect image, and determining persistence effect information based on the transparency information and a corresponding weight value; and
   determining the blur effect based on the persistence effect information.

13. The method according to claim 1, further comprising:
presenting the at least one first effect image in a preset effect display frame.

14. The method according to claim 13, wherein presenting the at least one first effect image in the preset effect display frame comprises:
   determining target display information of the first effect image in the effect display frame; and
   updating the first effect image based on the target display information and the effect display frame, so as to present the first effect image in the effect display frame.

15. The method according to claim 14, wherein the effect present frame is composed of two patches, and determining the target display information of the first effect image in the effect display frame comprises:
   determining first coordinate information of at least one vertex of the two patches, and determining second coordinate information of the at least one vertex based on a model matrix, a view matrix, and a projection matrix;
   determining a center point coordinate of the first effect image;
   determining a coordinate offset based on the center point coordinate and the second coordinate information; and
   determining, based on the coordinate offset, corresponding target vertex attribute information of the at least one vertex in the first effect image, and taking the target vertex attribute information as the target display information.

16. The method according to claim 15, wherein updating the first effect image based on the target display information and the effect display frame comprises:
   projecting the corresponding first effect image to a corresponding canvas in the effect display frame based on the target display information, so as to update the first effect image; and
   presenting the updated first effect image.

17. The method according to claim 1, wherein the page turning effect is performed with an axial symmetry line of the first effect image parallel to a horizontal plane as a turning axis.

18. An electronic device, comprising:
   one or more processors; and
   a storage means, configured to store one or more programs,
   when the one or more programs are executed by the one or more processors, the one or more processors are caused to:
   in response to an effect trigger operation, determine at least one first effect image, and present the at least one first effect image according to a preset image present mode;
   in response to detecting that a page turning condition is satisfied in a present process, perform a page turning effect on a current displayed first effect image, and present a remaining first effect image from the at least one first effect image according to the image present mode until an effect present stop operation is received; and
   determine brightness values corresponding to two to-be-used stickers at different turning angles corresponding to the current displayed first effect image when a page turning effect is performed on the current displayed first effect image, such that when the to-be-used stickers corresponding to the current displayed first effect image are turned, a part of the first effect image is adjusted to a corresponding brightness value.

19. A non-transitory storage medium comprising computer executable instructions, wherein the computer executable instructions, when executed by a computer processor, are configured to:
  in response to an effect trigger operation, determine at least one first effect image, and present the at least one first effect image according to a preset image present mode;
  in response to detecting that a page turning condition is satisfied in a present process, perform a page turning effect on a current displayed first effect image, and present a remaining first effect image from the at least one first effect image according to the image present mode until an effect present stop operation is received; and
  determine brightness values corresponding to two to-be-used stickers at different turning angles corresponding to the current displayed first effect image when a page turning effect is performed on the current displayed first effect image, such that when the to-be-used stickers corresponding to the current displayed first effect image are turned, a part of the first effect image is adjusted to a corresponding brightness value.

* * * * *